United States Patent [19]

Nilssen

[11] Patent Number: 5,004,955
[45] Date of Patent: Apr. 2, 1991

[54] ELECTRONIC BALLAST WITH SHOCK PROTECTION FEATURE

[76] Inventor: Ole K. Nilssen, Caesar Dr., Barrington, Ill. 60010

[21] Appl. No.: 448,880

[22] Filed: Dec. 12, 1989

Related U.S. Application Data

[62] Division of Ser. No. 830,270, Feb. 18, 1986.

[51] Int. Cl.[5] .............................................. H05B 41/29
[52] U.S. Cl. ..................................... 315/119; 315/127; 315/225; 315/DIG. 7
[58] Field of Search ..................... 315/119, 127, 209 R, 315/225, 307, DIG. 5, DIG. 7; 307/326; 328/7

[56] References Cited

U.S. PATENT DOCUMENTS 4,461,980  7/1984  Nilssen ..................... 315/DIG. 7 X
4,507,698  3/1985  Nilssen ..................... 315/DIG. 7 X

*Primary Examiner*—Robert J. Pascal

[57] ABSTRACT

An electronic ballast provides a high-frequency current-limited voltage between a first socket terminal and a second socket terminal. These socket terminals are adapted to receive and hold a rapid-start fluorescent lamp. The first terminal has a relatively low-magnitude potential with respect to ground; the second terminal has a relatively high-magnitude potential with respect to ground. A person causing in direct or indirect contact with the second terminal is apt to receive a hazardous electric shock. A self-oscillating electronic inverter is operable to provide the high-frequency voltage. To provide an output, this inverter has to be triggered into oscillation. However, if no current flows from the first terminal, the inverter will automatically become disabled within 25 milli-seconds; whereafter it will not be re-triggered for about 1.5 seconds. With no current flowing, the magnitude of the high-frequency AC voltage is high enough to permit proper starting of the rapid-start fluorescent lamp within a time span of 25 milli-seconds, but only after its cathodes have become incandescent. As soon as the lamp has started, lamp current flows from the socket terminals and through the fluorescent lamp. If lamp current flowing from the first terminal fails to materialize, or if interrupted, as for instance may happen when replacing the fluorescent lamp, the inverter becomes disabled; which means that the electric shock hazard represented by the second terminal will be removed within 25 milli-seconds.

11 Claims, 1 Drawing Sheet

ELECTRONIC BALLAST WITH SHOCK PROTECTION FEATURE

RELATED APPLICATION

This is a Division of prior application Ser. No. 06/830,270 filed Feb. 18, 1986.

BACKGROUND OF THE INVENTION

1. Field of Invention

The present invention relates to fluorescent lamp ballasts, particularly of a type providing protection from electric shock hazard to a person servicing lighting fixtures in which such ballasts are used.

2. Prior Art

In electronic fluorescent lamp ballasts of prior art, electric shock protection is generally accomplished by powering the fluorescent lamps by way of an isolation transformer. However, there are several drawbacks associated with the use of an isolation transformer: (i) substantial additional cost, (ii) significantly added weight and volume, and (iii) sizable reduction in overall efficiency.

Another approach to providing electric shock hazard protection is that of reducing the magnitude of the ballast output voltage in case the lamp is removed from its output. Such an approach is described in U.S. Pat. No. 4,461,980 to Nilssen. However, the particular method described by Nilssen in that patent does not provide protection in a situation where a person may be in contact between ground and the "hot" side of the ballast output, and if that person should then happen to draw enough current from that "hot" side to provide significant loading of the ballast output.

Still another approach to providing electric shock hazard protection is that of reducing the magnitude of the ballast output voltage in case a ground-fault current occurs. This approach is described in U.S. Pat. No. 4,507,698 to Nilssen. However, while this approach is indeed fully operable and does indeed significantly mitigate the several drawbacks associated with the use of an isolation transformer, there are complexities involved with accurately and inexpensively sensing the ground-fault current.

SUMMARY OF THE INVENTION

Objects of the Invention

An object of the present invention is that of providing a fluorescent lamp ballast for a lighting apparatus, wherein this ballast is operative to reduce the possibility of a person receiving a severe electric shock when servicing this lighting apparatus.

This as well as other objects, features and advantages of the present invention will become apparent from the following description and claims.

Brief Description

In its preferred embodiment, the present invention constitutes an electronic ballast that provides a high-frequency current-limited voltage between a first pair of socket terminals and a second pair of socket terminals. These pairs of socket terminals are adapted to receive and hold a rapid-start fluorescent lamp. The first terminal pair has a relatively low-magnitude potential relative to ground; the second terminal pair has a relatively high-magnitude potential relative to ground. A person coming in direct or indirect contact with the second terminal pair is apt to receive a hazardous electric shock.

A self-oscillating electronic inverter is operable to provide the high-frequency voltage. To provide an output, this inverter has to be triggered into oscillation. However, if no current flows to and/or from the first terminal pair, the inverter will automatically become disabled within about 25 milli-seconds; whereafter it will not be re-triggered for about 1.5 seconds.

With no current flowing, the magnitude of the high-frequency AC voltage is high enough to permit proper starting of a the rapid-start fluorescent lamp within a time span of 25 milliseconds, but only after its cathodes have become incandescent. As soon as the lamp has started, lamp current flows between the socket terminal pairs through the fluorescent lamp.

If lamp current flowing to/from the first terminal pair fails to materialize, or if it is interrupted, as for instance may happen when replacing the fluorescent lamp, the inverter becomes disabled; which means that the electric shock hazard represented by the second terminal pair will be removed within about 25 milli-seconds, thereafter not to re-occur for about 1.5 seconds.

DESCRIPTION OF THE PREFERRED EMBODIMENT

Details of Construction

Figure 1:
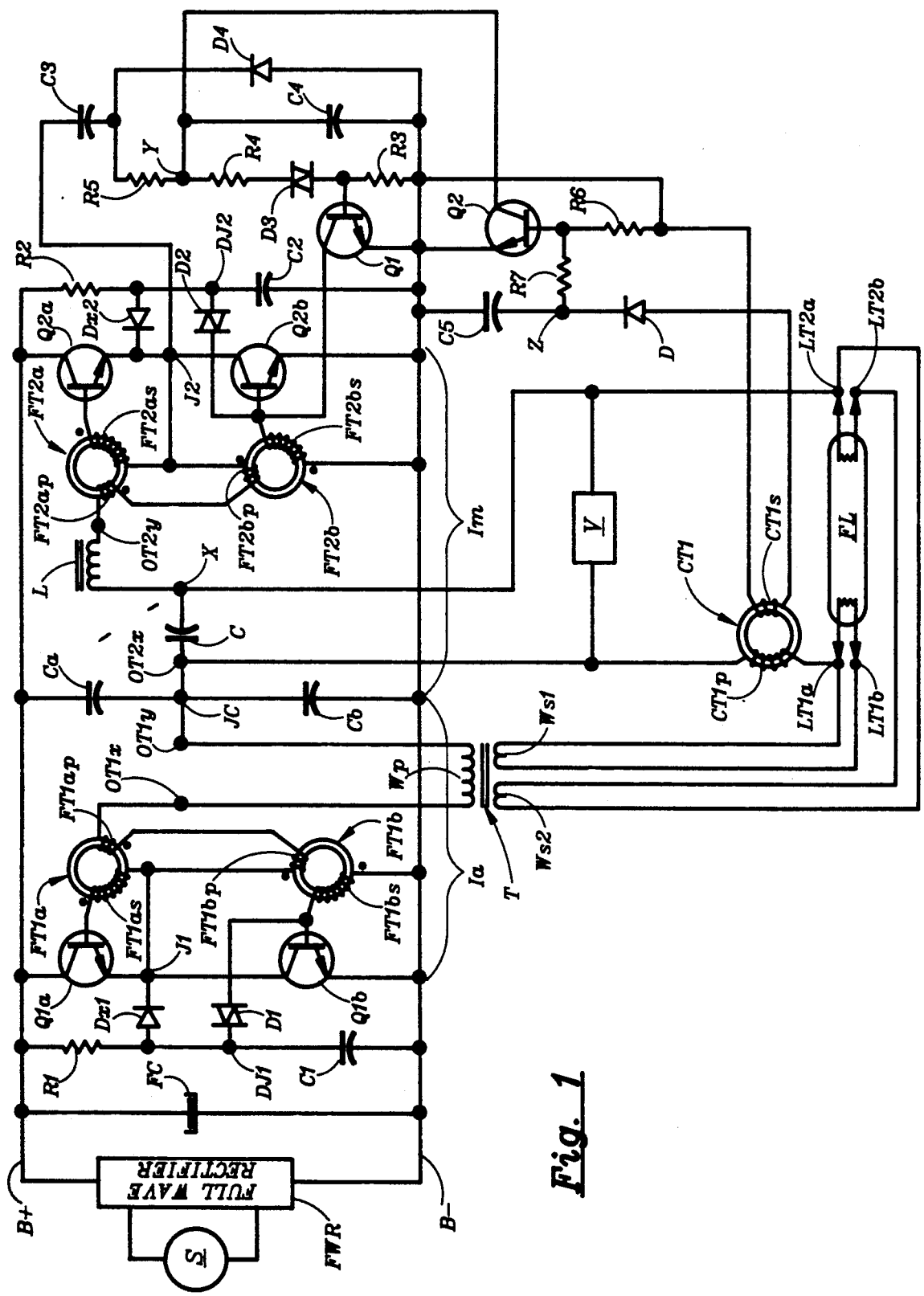
FIG. 1 illustrates the preferred embodiment of the invention and shows a first inverter operative to provide cathode heating for a fluorescent lamp, and a second inverter operative to controllably provide main operating power to the fluorescent lamp.

FIG. 1 illustrates the preferred embodiment of the invention and shows an AC voltage source S, which in reality is an ordinary 120 Volt/60 Hz electric utility power line.

Connected to S is a full-wave rectifier FWR that rectifies the AC voltage from S to provide a substantially constant-magnitude DC voltage between a positive power bus B+ and a negative power bus B—.

A first pair of transistors Q1a and Q1b are connected in series between the B+ bus and the B— bus in such a way that the collector of Q1a is connected to the B+ bus, the emitter of Q1a is connected with the collector of Q1b at a junction J1, and the emitter of Q1b is connected with the B— bus.

A second pair of transistors Q2a and Q2b are connected in series between the B+ bus and the B— bus in such a way that the collector of Q2a is connected to the B+ bus, the emitter of Q2a is connected with the collector of Q2b at a junction J2, and the emitter of Q2b is connected with the B— bus.

Primary winding FT1ap of saturable feedback transformer FT1a and primary winding FT1bp of saturable feedback transformer FT1b are connected in series between junction J1 and output terminal OT1x. Another output terminal OT1y is connected with junction JC between capacitors Ca and Cb; which capacitors are connected in series between the B+ bus and the B— bus.

Primary winding FT2ap of saturable feedback transformer FT2a and primary winding FT2bp of saturable feedback transformer FT2b are connected in series between junction J2 and output terminal OT2y. Another output terminal OT2x is connected with junction JC.

Secondary winding FT1as of feedback transformer FT1a is connected between the base and the emitter of transistor Q1a; and secondary winding FT1bs of feedback transformer FT1b is connected between the base and the emitter of transistor Q1b.

Secondary winding FT2as of feedback transformer FT2a is connected between the base and the emitter of transistor Q2a; and secondary winding FT2bs of feedback transformer FT2b is connected between the base and the emitter of transistor Q2b.

A capacitor C is connected between output terminal OT2x and a point X; and an inductor L is connected between point X and output terminal OT2y.

The assembly consisting of transistors Q1a and Q1b, feedback transformers FT1a and FT1b, and output terminals OT1x and OT1y is referred to as auxiliary inverter Ia. The assembly consisting of transistors Q2a and Q2b, feedback transformers FT2a and FT2b, and output terminals OT2x and OT2y is referred to as main inverter Im.

A resistor R1 is connected between the B+ bus and a junction DJ1; and a capacitor C1 is connected between junction DJ1 and the B− bus. A Diac D1 is connected between junction DJ1 and the base of transistor Q1b. A diode Dx1 is connected with its anode to junction DJ1 and with its cathode to junction J1.

A resistor R2 is connected between the B+ bus and a junction DJ2; and a capacitor C2 is connected between junction DJ2 and the B− bus. A Diac D2 is connected between junction DJ2 and the base of transistor Q2b; and a diode Dx2 is connected with its anode to junction DJ2 and with its cathode to junction J2.

Primary winding Wp of transformer T is connected with inverter output terminals OT1x and OT1y. Secondary winding Ws1 of transformer T is connected with lamp terminals LT1a and LT1b of fluorescent lamp FL; and secondary winding Ws2 of transformer T is connected with lamp terminals LT2a and LT2b of FL.

Lamp terminal LT2a is connected with point X, and lamp terminal LT1a is connected with output terminal OT2x by way of primary winding CT1p of a control transformer CT1. A Varistor V is connected between point X and output terminal OT2x.

Secondary winding CT1s of control transformer CT1 is connected between the B− bus and the anode of a diode D. The cathode of diode D is connected with a point Z.

A first auxiliary transistor Q1 is connected with its collector to the base of transistor Q2b and with its emitter to the B− bus. A second auxiliary transistor Q2 is connected with its collector to a point Y and with its emitter to the B− bus.

A resistor R3 is connected between the base of transistor Q1 and the B− bus; and a series-combination of a Diac D3 and a resistor R4 is connected between point Y and the base of transistor Q1.

A capacitor C3 is connected between junction J2 and the cathode of a diode D4. The anode of diode D4 is connected with the B− bus. A resistor R5 is connected between the cathode of diode D4 and point Y; and a capacitor C4 is connected between point Y and the B− bus.

A resistor R6 is connected between the base of transistor Q2 and the B− bus; and a resistor R7 is connected between the base of transistor Q2 and point Z. A capacitor C5 is connected between point Z and the B− bus.

A filter capacitor FC is connected between the B+ bus and the B− bus.

Details of Operation

The operation of the ballast arrangement of FIG. 1 may be further explained as follows.

FIG. 1 shows two half-bridge inverters: an auxiliary inverter Ia consisting of transistors Q1a and Q1b with their respective saturable positive feedback transformers FT1a and FT1b; and a main inverter Im consisting of transistors Q2a and Q2b with their respective saturable positive feedback transformers FT2a and FT2b.

Both the half-bridge inverters use capacitors Ca and Cb to provide for an effective center-tap between the B− bus and the B+ bus—this center-tap being junction JC.

Both inverters are capable of self-oscillation by way of positive feedback. However, to oscillate, each inverter has to be triggered into oscillation. When they do oscillate, the frequency of oscillation is about 30 kHz. For further explanation of the operation of this type of inverter, reference is made to U.S. Pat. No. 4,184,128, and particularly to FIG. 8 thereof.

Inverter Ia is triggered into oscillation a few milliseconds after application of power from source S—length of the delay being determined by the time it takes for capacitor C1 to charge to a voltage of magnitude high enough to cause Diac D1 ti break down and provide a trigger pulse to the base of transistor Q1b.

By way of transformer T, the output from inverter Ia is applied to the cathodes of fluorescent lamp FL, thereby conditioning this lamp and making it ready to conduct. For a typical fluorescent lamp, this conditioning takes from 1.0 to 1.5 second, after which time the lamp cathodes have reached incandescence and are capable of adequate electron emission.

Inverter Im is triggered into oscillation about 1.5 seconds after initial application of power from source S. Thus, by the time inverter Im starts oscillating, the fluorescent lamp has become fully conditioned and is ready to start without further delay.

That is, under normal circumstances, as soon as main inverter Im starts to oscillate, the fluorescent lamp instantly ignites (although not in normal instant-start fashion)—having by that time been fully conditioned to conduct. However, if the lamp does not ignite, the inverter ceases to oscillate within about 25 milli-seconds—as explained hereinbelow.

Inverter Im can be triggered out of oscillation as well. This is accomplished by way of charging capacitor C4 to a voltage of magnitude high enough to cause Diac D3 to break down; which, in turn, provides base current to transistor Q1, thereby causing this transistor Q1 to provide a momentary short circuit between the base and the emitter of transistor Q2b; which short circuit momentarily removes the positive feedback, thereby causing oscillation to cease.

As soon as inverter Im starts to oscillate, a 30 kHz squarewave voltage appears at junction J2; which voltage is applied by way of capacitor C3 to rectifier D4. Thus, immediately after onset of oscillation of Im, capacitor C4 starts to charge toward the point where Diac D3 will break down. The time to reach that point is determined by the values of resistor R4 and capacitor C4, and is chosen to be about 25 milli-seconds.

Thus, by way of the arrangement comprising elements C3, D4 R5, C4, R4 and D3, inverter Im is made operative to squelch its own oscillation within about 25 milli-seconds after it starts. In other words, absent other factors, inverter Im would operate in such manner as to oscillate for a period of about 25 milli-seconds each time after having been quiescent for about 1.5 seconds.

But, since a fluorescent lamp can not reasonably operate by being powered only for 25 milli-seconds out of each 1.5 seconds, arrangements have been provided by which the otherwise automatic squelching of the oscillation is prevented from taking place as long as current flows through primary winding CT1p of current transformer CT1.

Current through primary winding CT1c causes current to flow from secondary winding CT1s, thereby (by way of diode D, capacitor C5 and resistor R6) to provide base current to transistor Q2 of such amount as to cause this transistor to become fully conductive. With transistor Q2 fully conductive, capacitor C4 is prevented from being charged; which means that the otherwise automatic squelching of the oscillation of inverter Im is prevented for as long as current is flowing through the wire connecting one side of primary winding CT1p with lamp terminal LT1a.

Thus, as long as lamp current is flowing into (or out of) lamp terminals LT1a and LT1b, inverter Im will continue to oscillate once it has started. However, if this lamp current is interrupted, inverter Im will be triggered out of oscillation within about 25 milli-seconds.

Additional Comments (a) To prevent redundant triggering of inverter Ia, diode Dx1 is placed between junctions DJ1 and J1. Similarly, to prevent redundant triggering of inverter Im, diode Dx2 is placed between junctions DJ2 and J2.

In this connection, it should be noted that—by way of diode Dx2—the very oscillation of inverter Im automatically causes capacitor C2 to discharge; which implies that each time after the inverter has been stopped from oscillation, capacitor C2 has to be recharged all the way from "scratch".

(b) In some situations it may be advantageous to remove the conditioning voltage after the initial lamp conditioning has been accomplished. In particular, it may be advantageous for energy-efficiency reasons to remove the cathode heating power after the lamp has ignited.

This can be accomplished simply by making provisions for inverter Ia to be disabled as soon as lamp current flows through the primary winding CT1p of transformer CT1; which, in turn, can be accomplished very simply by placing an auxiliary transistor across the base-emitter junction of transistor Q1b in manner similar to that in which transistor Q1 is placed across the base-emitter junction of transistor Q2b, and by connecting a resistor between point Z and the base of this auxiliary transistor.

If it were to be automatically disabled in the manner suggested, inverter Ia would equally automatically re-initiate its oscillation immediately upon cessation of the flow of lamp current through primary winding CT1p.

(c) Varistor V is chosen such that it will limit the voltage developing across tank capacitor C to a magnitude that is suitable for proper lamp ignition; which voltage might be of magnitude about twice that of the lamp's normal operating voltage.

If for some reason the fluorescent lamp should not ignite, the magnitude of the voltage developing across capacitor C (as resulting from Q-multiplication) would be limited by the voltage-clamping characteristics of Varistor V.

(d) As long as power is flowing through the Varistor, the rate of power dissipation therein is very large: about twice as large as the normal full power applied to the lamp when it is operating. With this full power being typically on the order of 80 Watt for a pair of F40/T12 fluorescent lamps (which is the most commonly occurring fluorescent lamp load), the implication is that the Varistor has to be able to handle a dissipation of about 160 Watt. This amount of power dissipation is well within the limits of an ordinary inexpensive Varistor, as long as the average dissipation does not exceed about 2 Watt; which, in the present arrangement, it will not since the 80 Watt dissipation can only occur at a maximum duty-rate of 25 milli-seconds out of every 1.5 seconds (or 1500 milli-seconds).

(e) Thus, as long as any output current from inverter Im is prevented from flowing through the primary winding of control transformer CT1, the output voltage provided between terminals LT1a and LT2a will consist of intermittent pulses of 30 kHz voltage of magnitude determined by the voltage-limiting characteristics of the Varistor. These pulses will be of about 25 milli-seconds duration; and they will be spaced apart by about 1500 milli-seconds. As a result, the RMS magnitude of the voltage then provided between terminals LT1a and LT2a will be reduced by the square root of the ratio between 1500 and 25, or by a factor of about 7.25, as compared to the RMS magnitude of the 30 kHz voltage simply as limited in magnitude by the Varistor.

(f) It is noted that source S, being an ordinary electric utility power line, is connected in circuit with earth ground.

(g) Output terminal OT2x, which is connected with terminal LT1a, exhibits no significant electric shock hazard to a person coming in contact therewith, even if either or both inverters are in operation, and even if that person is also in contact with earth ground. Point X, however, which is connected with terminal LT2a, does constitute a potentially significant electric shock hazard as long as inverter Im is in operation, but not otherwise. Thus, if the fluorescent lamp is removed from terminals LT1a and LT1b, inverter Im stops operation within about 25 milli-seconds, and it would thereafter not be possible to receive a serious electric shock from terminals LT2a and/or LT2b.

(h) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:
1. A combination comprising:
   an AC current source powered from a DC voltage and operable, except after having been provided with a disable signal at a set of disable terminals, to provide an AC output current from a pair of output terminals;
   gas discharge lamp connected with the output terminals and normally operative to constitute an adequate load for the AC current source, thereby to cause the magnitude of the voltage across the output terminals to stay below a first level for as long as the lamp is indeed so operative;

voltage-limiting means effectively connected across the output terminals and operative, in case the lamp were to fail to constitute said adequate load, to prevent the magnitude of the voltage between the output terminals from exceeding a second level, the second level being (i) higher than the first level, and (ii) substantially independent of the magnitude of the DC voltage; and control means connected in circuit between the output terminals and the disable terminals, the control means being operative: (i) to sense the presence of the AC output current when it is flowing through the lamp, and (ii) to provide said disable signal in case the AC output current were to fail to flow through the lamp for longer than a brief period of time;

thereby to prevent the voltage-limiting means from having to absorb power for longer than this brief period.

2. The combination of claim 1 wherein the voltage-limiting means comprises a non-linear resistance means.

3. The combination of claim 2 wherein the voltage-limiting means comprises a Varistor.

4. The combination of claim 1 wherein substantially no current flows through the voltage-limiting means as long as the magnitude of the voltage across the output terminals remains below said first level.

5. The combination of claim 1 and means operative to cause the AC current source, after having been disabled for longer than a certain period of time, to resume supplying the AC output current.

6. The combination of claim 5 wherein the duration of the brief period is on the order of 25 milli-seconds and that of the certain period is on the order of one second or more.

7. A combination comprising:

an AC current source powered from a DC voltage and operable, except for a certain period of time after having been provided with a disable signal at a set of disable terminals, to provide an AC output current from a pair of output terminals;

gas discharge lamp connected with the output terminals and normally operative to constitute an adequate load for the AC current source, thereby to cause the magnitude of the voltage across the output terminals to stay below a first level for as long as the lamp is indeed so operative;

voltage-limiting means effectively connected across the output terminals and operative, in case the lamp were to fail to constitute said adequate load, to prevent the magnitude of the voltage between the output terminals from exceeding a second level, the second level being: (i) higher than the first level, and (ii) substantially independent of the magnitude of the DC voltage; and control means connected in circuit between the output terminals and the disable terminals, and operative to provide said disable signal in case the gas discharge lamp were to fail to constitute said adequate load and AC output current were to flow through the voltage-limiting means for longer than a brief period of time;

thereby to prevent the voltage-limiting means from having to absorb power for longer than this brief period.

8. A combination comprising:

an AC current source powered from a DC voltage and operable, except for a certain period of time after having been provided with a disable signal at a set of disable terminals, to provide an AC output current from a pair of output terminals;

gas discharge lamp connected with the output terminals and normally operative to constitute an adequate load for the AC current source, thereby normally to permit the AC output current to flow through the lamp without causing the magnitude of the voltage across the output terminals to exceed a first level;

voltage-limiting means effectively connected across the output terminals and operative, in case the lamp were to fail to constitute said adequate load, to prevent the magnitude of the voltage between the output terminals from exceeding a second level, the second level being: (i) higher than the first level, and (ii) substantially independent of the magnitude of the DC voltage; and control means connected in circuit between the output terminals and the disable terminals, and operative to provide said disable signal in case the AC output current were to flow through the voltage-limiting means, rather than through the lamp, for longer than a brief period of time.

9. An arrangement comprising:

source means operable to provide a main output voltage between a first output terminal means and a second output terminal means; a gas discharge lamp being disconnectably connected between the two terminal means; the second output terminal means representing a possible electric shock hazard to a person coming in electrical contact therewith if that person also were to be in electrical contact with earth ground; the source means having control input means operative on receipt of a control action to reduce the electric shock hazard represented by the second output terminal means; and control means connected in circuit with the first output terminal means and the control input means; the control means being responsive to current flowing in the first output terminal means and operative to provide the control action in the event that the magnitude of the current so flowing were to be reduced below a certain level and to remain below this certain level for longer than a brief period of time.

10. The arrangement of claim 9 wherein the control means includes current transformer means connected in circuit with at least one of the output terminal means.

11. The arrangement of claim 10 wherein at least one of the output terminals means has two electrical conductor means between which there exists a cathode voltage; the RMS magnitude of the cathode voltage being substantially lower than the RMS magnitude of the main output voltage.

* * * * *